US006557662B1

(12) United States Patent
Andonian et al.

(10) Patent No.: US 6,557,662 B1
(45) Date of Patent: May 6, 2003

(54) MAGNETO-RHEOLOGICAL SIMULATED STEERING FEEL SYSTEM

(75) Inventors: Brian James Andonian, Livonia, MI (US); Gregory James Stout, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/721,117

(22) Filed: Nov. 22, 2000

(51) Int. Cl.[7] ............................................... B62D 5/00
(52) U.S. Cl. .................... 180/402; 180/410; 180/446
(58) Field of Search ................................ 180/402, 444, 180/443, 446, 400, 412; 463/36

(56) References Cited

U.S. PATENT DOCUMENTS

| 4,830,127 | A | * | 5/1989 | Ito et al. ................... 180/79.1 |
| 4,896,754 | A | | 1/1990 | Carlson et al. |
| 5,251,135 | A | | 10/1993 | Serizawa et al. |
| 5,354,488 | A | * | 10/1994 | Shtarkman et al. ...... 252/62.56 |
| 5,573,088 | A | | 11/1996 | Daniels |
| 5,598,908 | A | | 2/1997 | York et al. |
| 5,709,281 | A | * | 1/1998 | Sherwin et al. ............. 180/272 |
| 5,732,791 | A | * | 3/1998 | Pinkos et al. ............... 180/444 |
| 5,761,627 | A | | 6/1998 | Seidel et al. |
| 5,919,241 | A | | 7/1999 | Boulourchi et al. |
| 5,967,273 | A | * | 10/1999 | Hampton .................... 192/21.5 |
| 6,059,068 | A | * | 5/2000 | Kato et al. .................. 180/402 |
| 6,089,115 | A | * | 7/2000 | Yoshioka ....................... 74/417 |
| 6,138,788 | A | * | 10/2000 | Bohner et al. .............. 180/405 |
| 6,183,386 | B1 | * | 2/2001 | Duggan ......................... 475/84 |
| 6,283,859 | B1 | | 9/2001 | Carlson |
| 6,389,343 | B1 | * | 5/2002 | Hefner et al. ................. 701/41 |

FOREIGN PATENT DOCUMENTS

| EP | 0 442 570 A1 | 8/1991 |
| EP | 0 522 924 A1 | 1/1993 |
| EP | 0 726 193 A2 | 8/1996 |
| EP | 0 776 813 A1 | 6/1997 |
| EP | 1 125 825 A2 | 8/2001 |
| GB | 2 351 953 A | 1/2001 |

OTHER PUBLICATIONS

Patent Abstracts of Japan. vol. 1988, No. 11. Publication Date: Jun. 26, 1998 JP 10171542 A (Fujijura Kasei Co. Ltd.).

* cited by examiner

Primary Examiner—Lesley D. Morris
Assistant Examiner—Tony Winner
(74) Attorney, Agent, or Firm—John E. Kajander, Esq.

(57) ABSTRACT

A simulated steering feel system 10 is provided including a magneto-rheological fluid rotary resistance device 12. The magneto-rheological fluid rotary resistance device 12 is utilized to impart improved feedback, torque to a steering wheel 32.

9 Claims, 2 Drawing Sheets

MAGNETO-RHEOLOGICAL SIMULATED STEERING FEEL SYSTEM

TECHNICAL FIELD

The present invention relates generally to a simulated steering feel system and more particularly to a simulated steering feel system utilizing a magneto-rheological fluid rotary resistance system.

BACKGROUND OF THE INVENTION

The use of simulated steering feel systems (SSFS) is well known in the prior art. SSFS's are presently used for a variety of applications including automotive drive simulators, engineering research tools, and entertainment devices. In addition, as advancements in automotive design continue to progress, advancements such as steer by wire (SBW) will likely require SSFS'ss in order to provide "road feel" or feedback response to a driver.

Although new improved uses of SSFS's will continue to develop, current SSFS can have undesirable characteristics. Current SSFS designs commonly use conventional brush or brushless electric motors. Such conventional electric motors can have disadvantages. Often conventional electric motors add undesirable weight to the SSFS'ss. Application work requirements can also lead to the need for undesirably large and heavy conventional motors. These large conventional motors can also require high current levels for proper operation. The power requirements to provide adequate feedback torque using these motors can be highly undesirable.

It would, therefore, be highly desirable to have a simulated steering feel system with reduced size and weight and that contains further improvements over present SSFS designs utilizing conventional brush or brushless motors.

SUMMARY OF THE INVENTION

It is therefore an object of the present invention to provide a simulated steering feel system with the potential for reduced size and increased performance.

In accordance with the objects of the present invention, a simulated steering feel system is provided. A simulated steering feel system includes a magneto-rheological fluid rotary resistance device. The magneto-rheological fluid rotary resistance device is utilized to impart feedback torque to a steering wheel. Using this device, road feel can be imparted to the steering wheel from a small light package with improved performance.

Other objects and features of the present invention will become apparent when viewed in light of the detailed description of the preferred embodiment when taken in conjunction with the attached drawings and appended claims.

DESCRIPTION OF THE PREFERRED EMBODIMENT(s)

Figure 1:
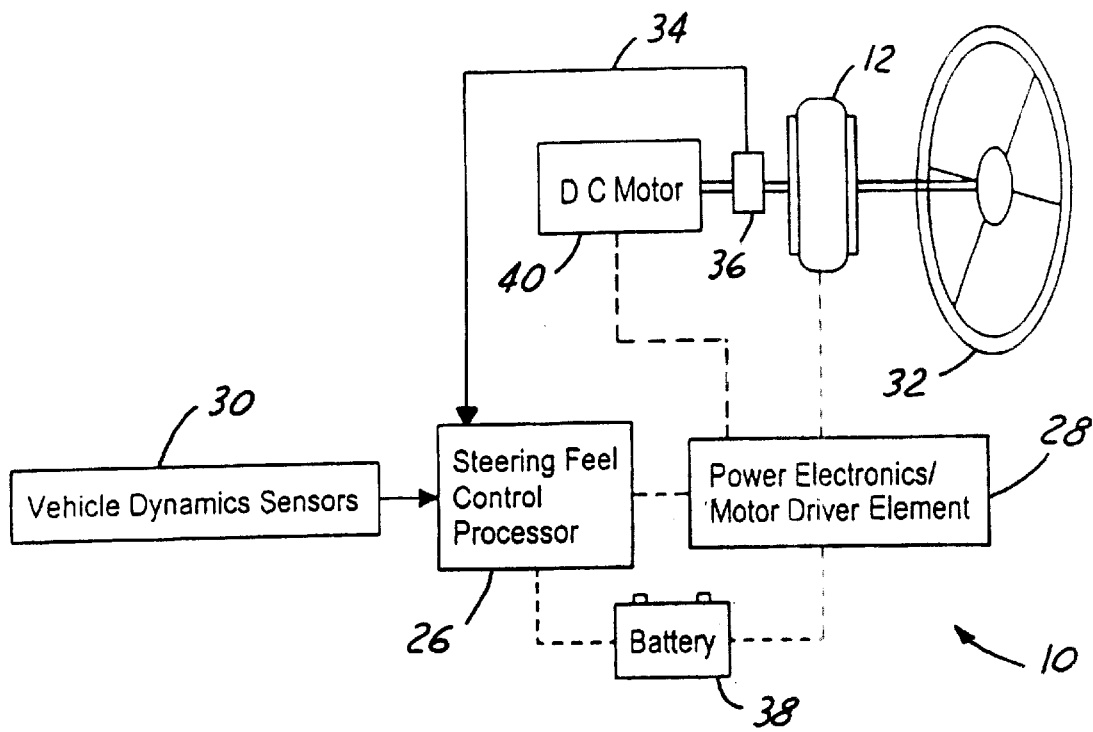
FIG. 1 is an embodiment of a simulated steering feel system in accordance with the present invention for use in an automobile.

Referring now to FIG. 1, which is an illustration of an embodiment of a simulated steering feel system 10 in accordance with the present invention. The embodiment illustrated in FIG. 1 is preferably for use in an automobile to be used alongside the steer by wire system, although the illustrated embodiment can be used alongside any automotive system where simulated steer feel is desired. In an alternate embodiment, whose descriptions will follow, the simulated steering feel system 10 can be used in a variety of applications, including applications independent of an automobile.

Figure 2:
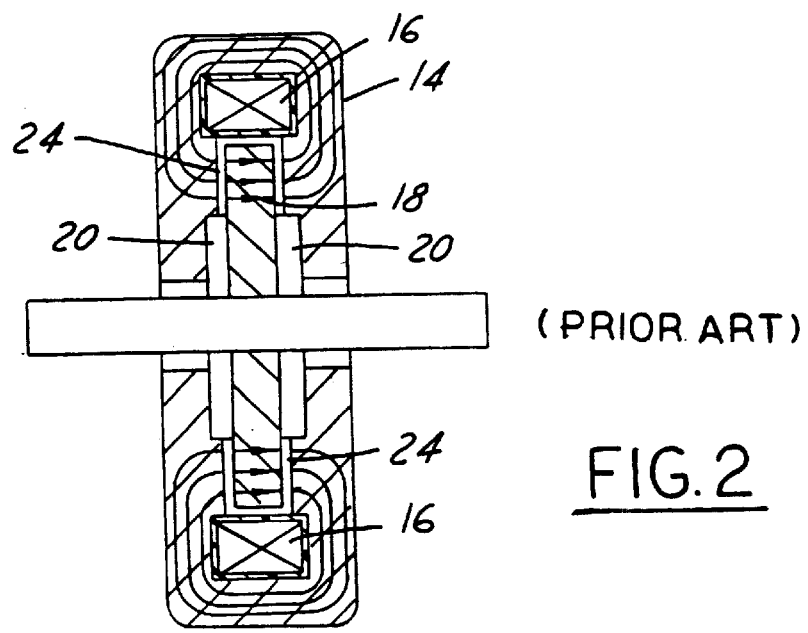
FIG. 2 is an illustration of a magneto-rheological fluid resistance device for use in a simulated steering feel system in accordance with the present invention.

The simulated steering feel system 10 includes a magneto-rheological fluid rotary resistance device 12. Magneto-rheological fluid rotary resistance devices (MF devices) are well known in the prior art. Although a wide variety of designs for MF devices are known, one known form of the MF device is illustrated in FIG. 2. In this embodiment, the MF device 12 includes a housing 14, coil 16, rotor element 18, spacers 20, shaft 22, and magneto-rheological fluid 24. When activated the coil 16 creates a magnetic field which causes the particles within the magneto-rheological fluid 24 to align themselves with the direction of the field. The formulation of particle chains restricts the shearing action of the magneto-rheological fluid 24, creating a near-solid solution. This restricts the rotary movement of the rotor element 18. One advantage of using a MF device 12, is that MF devices 12 provide higher torque within a smaller package than conventional electric motors. In addition, MF devices 12 require less power to create feedback torque than conventional electric motors.

The simulated steering feel system 10 can further include a steering feel control processor 26. In one embodiment, the steering feel control processor is a dedicated processor utilized to control the MF device 12. In alternate embodiments, the steering feel control processor can be simply the function of a larger automotive computer system.

Although the steering feel control processor 26 can be utilized to directly control the MF device 12, in alternate embodiments, a motor driver element 28 may be used in conjunction with the steering feel control processor 26 to control and power the MF device 12. The simulated steering feel system 10 can additionally include at least one vehicle dynamic sensor 30. Vehicle dynamic sensors 30 can be used in a variety of automotive environmental conditions, including but not limited to, vehicle speed, vehicle acceleration, load feel and wheel position. The steering feel control processor 26 uses information provided' by the vehicle dynamic sensors 30 to determine an appropriate feedback torque or "road feel". The steering control processor 26 then utilizes the MF device 12 to impart such "road feel" to the steering wheel 32.

In an alternate embodiment, the steering feel control processor 26 may further receive steering wheel information 34 from a steering wheel sensor 36 and use this information in combination with the information provided by vehicle dynamic sensors 30 to create a closed loop system wherein "road feel" is further improved.

The use and feel of such steering feel control processors is well known in the prior art. Although the simulated steering feel system 10 may be powered by a variety of sources, in one preferred embodiment, the simulated steering feel system 10 is powered by automotive battery 38.

In addition, simulated steering feel system 10 can further include a DC motor element 40. The DC motor element 40 can be used in conjunction with the MF device 12 to further improve the functionality of the simulated steering feel system 10. In one embodiment, the DC motor element 40 is simply used to make the steering wheel 32 self-centering. In other embodiments, however, the DC motor element 40 can be used to assure the steering wheel 32 is always at the proper angle with respect to the road wheels (not shown), provide additional road-feel to the steering wheel 32, or provide a redundant back up system to the MF device 12. In addition, when a DC motor element 38 is used in conjunction with the MF device 12, the size and corresponding energy draw of the DC motor element 40 can be reduced compared to the required size of a DC motor operating without a MF device. In still another embodiment, the self-centering functions provided by a DC motor element 40 can be supplied by a variety of known devices such as torsional springs or elastic members.

Figure 3:
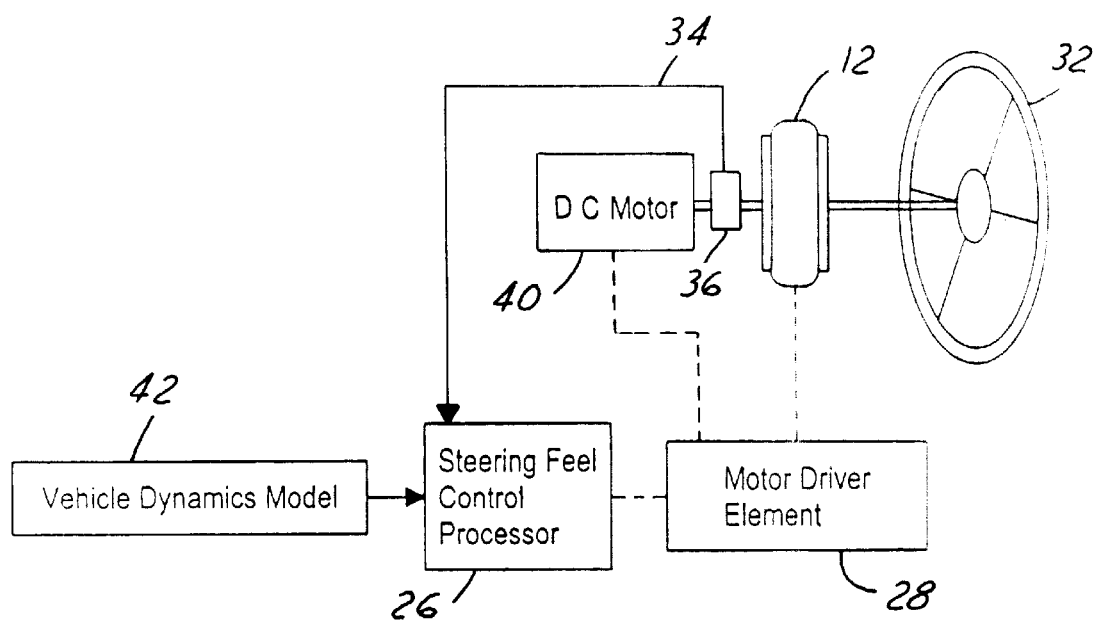
FIG. 3 is an embodiment of a simulated steering feel system in accordance with the present invention for use in a driving simulator.

Although simulated steering feel system 10 has thus far been described in terms of an in vehicle system, the simulated steering feel system 10 can be used in a variety of other applications. Such additional applications can include, but are not limited to, laboratory testing of steering feel tuning, automotive driving simulators, or entertainment devices. When used in such applications, a steering feel control processor 26 can be any controlling computer device. In addition, vehicle dynamic sensors 30 can be replaced by vehicle dynamic models 42, or other informational sources containing information on "road feel" (see FIG. 3). The vehicle dynamic models 42 can consist of automotive performance models or gaming simulation data, or a variety of other informational sources. In addition, in these embodiments, it is contemplated that the simulated steering feel system 10 may be supplied by any acceptable power source.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A simulated steering feel system for use in an automobile comprising:

a magneto-rheological fluid rotary resistance device; and a DC motor element, said DC motor element used in conjunction with said magneto-rheological fluid rotary resistance device to impart road feel to a steering wheel.

2. A simulated steering feel system for use in an automobile as described in claim 1 further comprising:

a steering feel control processor.

3. A simulated steering feel system for use in an automobile as described in claim 1 further comprising:

at least one vehicle dynamic sensor.

4. A simulated steering feel system for use in an automobile as described in claim 1 further comprising a steering wheel sensor element.

5. A simulated steering feel system for use in an automobile as described in claim 1 further comprising:

a motor driver element, said motor driver element utilized to operate said magneto-rheological fluid rotary resistance device.

6. A simulated steering feel system for use in an automobile as described in claim 1 for use in an automobile in conjunction with a steer by wire system.

7. A method of creating simulated steering feel for use in an automobile comprising:

determining an appropriate feedback torque to simulate road feel; and transmitting said feedback towards the steering wheel using a magneto-rhetological fluid rotary resistance device in conjunction with a motor element.

8. A method of creating simulated steering feel for use in an described in claim 7 wherein determining appropriate feedback torque comprises the steps of measuring vehicle dynamics characteristics; and imputing an appropriate feedback torque using said vehicle dynamic characteristics.

9. A method of simulating steering feel for use in an automobile as described in claim 7 further comprising the step of transmitting said feedback torque towards the steering wheel using a DC motor element.

\* \* \* \* \*